United States Patent [19]

Hart

[11] 4,248,447
[45] Feb. 3, 1981

[54] VEHICLE SUSPENSION SYSTEM
[75] Inventor: Cullen P. Hart, Peoria, Ill.
[73] Assignee: Caterpillar Tractor Co., Peoria, Ill.
[21] Appl. No.: 133,633
[22] Filed: Dec. 6, 1979
[51] Int. Cl.$^3$ .............................................. B60G 9/02
[52] U.S. Cl. ........................... 280/112 R; 280/112 A; 280/688; 280/713; 280/716
[58] Field of Search .............. 280/112 R, 112 A, 688, 280/716, 713, 81.5, 682, 683, 687, 678; 180/56

[56] References Cited

U.S. PATENT DOCUMENTS

| | | | |
|---|---|---|---|
| 3,155,397 | 11/1964 | Stump | 280/81.5 |
| 3,520,548 | 7/1970 | McGee | 280/678 |
| 3,552,798 | 1/1971 | Cole | 298/22 R |
| 3,726,540 | 4/1973 | Grooss | 280/677 |
| 3,768,672 | 10/1973 | Grooss | 280/638 |
| 3,840,244 | 10/1974 | Gee | 280/688 |
| 4,053,170 | 10/1977 | Hyler | 280/112 R |
| 4,053,171 | 10/1977 | Hyler | 280/112 R |
| 4,057,121 | 11/1977 | Stedman | 180/56 |
| 4,071,277 | 1/1978 | Stedman | 180/60 |

Primary Examiner—Robert R. Song
Attorney, Agent, or Firm—Phillips, Moore, Weissenberger, Lempio & Majestic

[57] ABSTRACT

The advent of relatively wide beadless tires on off-highway trucks and the like has dictated the desirability of providing a suspension system which separates the damping functions during the bounce and roll movements occurring between a truck frame and an axle assembly suspended thereunder. In particular, it is desirable to provide a soft suspension during the bounce mode of vehicle operation whereas a relatively stiff suspension is desired during the roll mode thereof. The suspension system (12) of this invention accomplishes the above by providing a first suspension (18) for damping bouncing movements (B) and a separate and isolated second, suspension (24) for damping rolling movements (R), with the second suspension (24) being disposed in a vertical plane which intersects a universal connection (16) connecting an axle assembly (11) to a vertical frame (10). The second suspension (24) includes a pair of springs (25) which are spaced outboard of the frame (10) to and in stabilizing the vehicle.

6 Claims, 4 Drawing Figures

VEHICLE SUSPENSION SYSTEM

DESCRIPTION

TECHNICAL FIELD

This invention relates to a suspension system for mounting an axle assembly beneath a frame of a vehicle.

BACKGROUND ART

The advent of the beadless, i.e., closed torus, tire has dictated the desirability of using wider tires supported on a rear axle assembly which is suspended beneath a vehicle frame by a "soft" suspension system. Such desiderata is difficult to accomplish in respect to conventional suspension systems for off-highway trucks, for example, wherein four tires are normally mounted on a rear axle assembly thereof and require accommodation within a high percentage of available vehicle width. A laterally spaced pair of suspension cylinders, normally utilized in such a suspension system, function to provide both roll and bounce suspension and control.

In addition to giving rise to a spacing problem for accommodating the two cylinders, movement of the cylinders into close proximity to each other will disadvantageously reduce the roll resistance of the rear axle assembly. Furthermore, any attempt to soften the suspension system by reducing the composite spring rate of the cylinders will also function to reduce the desired roll resistance.

One solution to the above problem is to provide a suspension system utlizing a single suspension cylinder, interconnected between the frame of the vehicle and the axle housing proper, in combination with a single suspension device interconnected between the frame and the axle housing and disposed alongside the axle housing. In this type of conventional suspension system a forward end of the axle housing is attached by a universal connection to the frame. Since the latter suspension device is spaced longitudinally between the suspension cylinder and the universal connection, such device is also subjected to relative bouncing as well as rolling movements between the frame and axle housing. Thus, it cannot be made relatively "stiff" and inextensible to solely provide the suspension control during such rolling movements.

Other proposed solutions have included the positioning of a single auxiliary spring suspension device transversely of a ball and socket connection, interconnecting the frame of a vehicle and the rear axle housing thereof. The device is disposed within the confines of the frame and does not provide the desired stability and damping of rolling movements.

DISCLOSURE OF INVENTION

The present invention is directed to overcoming one or more of the problems as set forth above.

In one aspect of this invention, a vehicle comprises a frame, an axle assembly, connection means for permitting relative bouncing and rolling movements between the frame and axle assembly, and a suspension system mounting the axle assembly beneath the frame, including first suspension means for damping the bouncing movement and second suspension means for damping rolling movement. The improvement is in the second suspension means which comprises a pair of springs are disposed on either side of the connection means in a vertical plane perpendicular to the longitudinal axis of the vehicle and further disposed outboard of the frame.

The improved suspension system of this invention is particularly adapted for mounting a rear axle assembly to a frame of a truck or the like to permit the above first and second suspension means to function independently of each other for controlling bounce and roll, respectively. Such independent suspension control thus facilitates close design control over the suspension system whereby the first suspension means, such as a standard suspension cylinder, can be made relatively "soft" to dampen bouncing movements of the axle assembly and the second suspension means can be made relatively "stiff" to solely dampen rolling movements thereof. The lateral spacing of the pair of springs of the second suspension means aids in stabilizing the vehicle.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
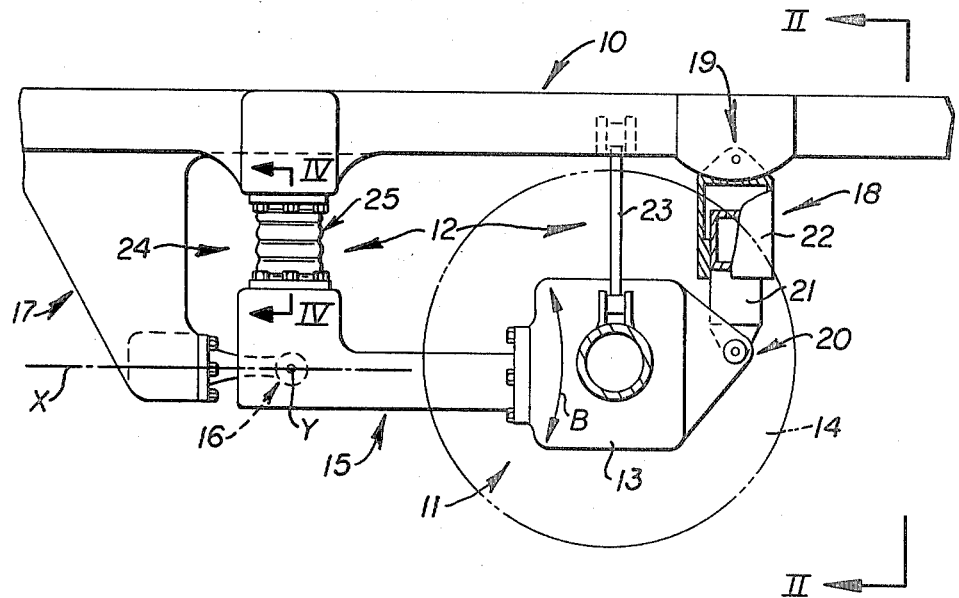
FIG. 1 is a partially sectioned, side elevational view of the vehicle suspension system embodiment of the present invention.

FIG. 1 illustrates a main frame 10 of a vehicle, such as an off-highway truck, mounted on an axle assembly 11 by a suspension system 12. As more clearly shown in FIGS. 2 and 3, axle assembly 11 comprises an axle housing 13 having two pairs of road wheels or tires 14 mounted on either side thereof in a conventional manner. The operational characteristics of the beadless tire has made it desirable to provide wide tires and to also employ a "softer" vehicle suspension system for damping relative bouncing movement between frame 10 and axle assembly 11.

As discussed briefly above, a standard off-highway truck, now manufactured by Caterpillar Tractor Co., the assignee of this application, employs a pair of laterally-spaced suspension cylinders interconnected between the rear axle housing and the frame of the truck. The cylinders function to control both relative rolling and bouncing movements between the frame and axle housing. Such cylinders pose a spacing problem when the relatively wide beadless tires are employed on the vehicle, thus requiring movement of the cylinders closer together. In addition, close proximity of the cylinders will reduce the roll resistance of the rear axle assembly. Roll resistance is also reduced should the spring rate of the cylinders be reduced to aid in bounce control.

Suspension system 12 overcomes such problems by providing a compact system which is designed to have separate and isolated means for damping relative bouncing and rolling movements between frame 10 and axle assembly 11 whereby a "soft" spring is provided for damping bounce and a relatively "stiff" and separate spring system is provided for damping roll. The term "bounce" is well known in the art to mean the generally vertical oscillation of the spring mass of a vehicle in a substantially longitudinal plane, consisting primarily of vertical displacement of the weight supported by suspension system 12, whereas "roll" means the angular displacement of the spring mass about a central longitudinal axis X thereof in a substantially transverse plane in respect to its static position.

Figure 2:
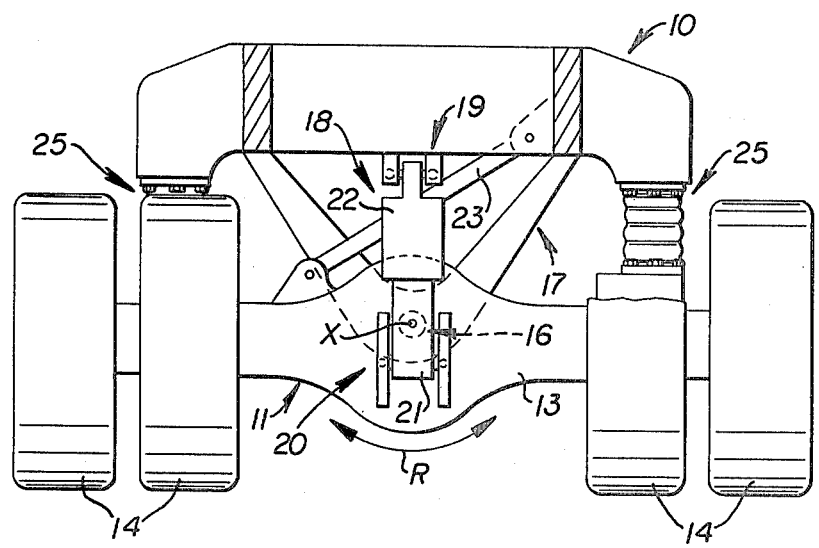
FIG. 2 is an end elevational view of a suspension system, taken in the direction of arrows II—II in FIG. 1.
Figure 3:
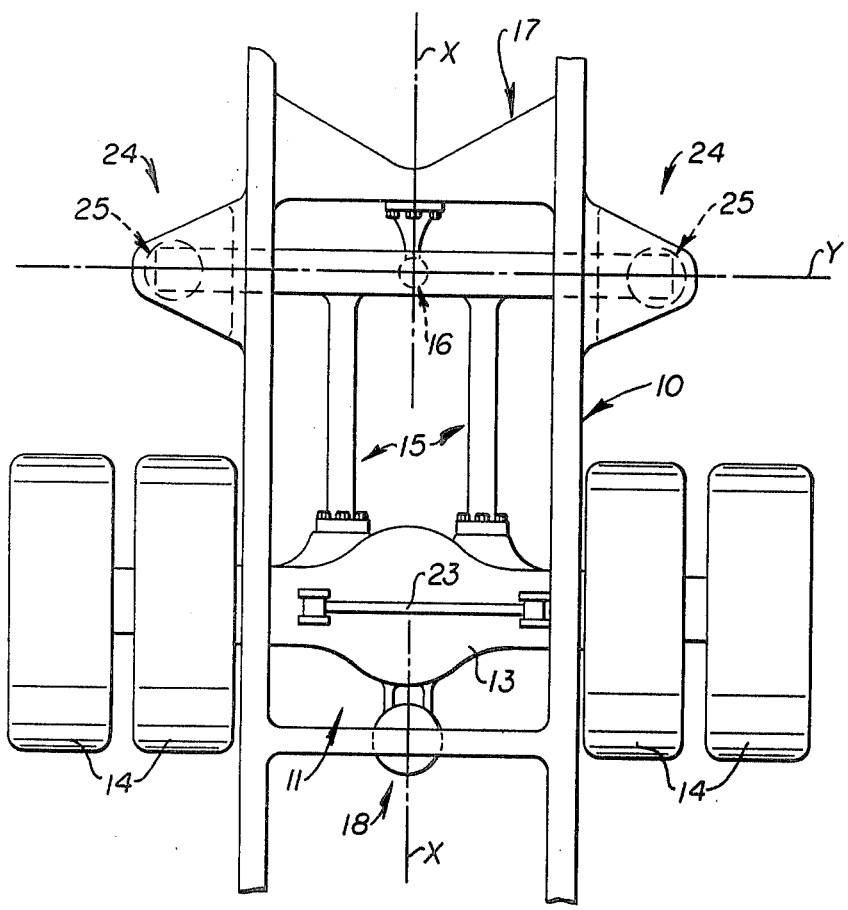
FIG. 3 is a top plan view of the suspension system.

Referring to FIGS. 1 and 3, axle assembly 11 comprises a generally T-shaped frame member 15 having its rearward end suitably secured to axle housing 13. A universal connection means 16, shown in the form of a standard ball and socket, connects a forward end of member 15 to a downward extension 17 of frame 10 to permit both relative bouncing and rolling movements between the frame and axle assembly 11. As shown in FIG. 2, rolling movements R will generally occur about a longitudinal axis X of the vehicle, whereas generally vertical bouncing movements B (FIG. 1) will occur about a transverse axis Y which intersects axis X and is perpendicular thereto.

Suspension system 12, mounting axle assembly 11 beneath frame 10 for controlling the above bouncing and rolling movements, includes a first suspension means or cylinder 18. The cylinder is conventional and may be interconnected between frame 10 and axle housing 13 by standard ball and socket connections 19 and 20, respectively, to accomodate both relative bouncing and rolling movements between frame 10 and axle assembly 11. Cylinder 18 may be tuned to provide a "soft" spring rate since it is purposely designed to solely dampen bouncing movements B.

A conventional suspension cylinder of this type may comprise, for example, a piston 21 reciprocally mounted in a housing 22 whereby the piston will move upwardly in the housing upon relative upward movement of axle assembly 11 in FIG. 1 to compress a volume of gas, such as nitrogen, contained therein. This movement of the strut will also force oil into a rebound chamber through orifices defined in the cylinder. When axle assembly 11 drops relative to frame 10, the compressed nitrogen will function to push the strut 21 in a smooth manner, back to its normal position, and orifices and a ball check valve will control oil flow and rebound rate to prevent harsh rebounding. Since cylinder 18 is conventional, further explanation thereon is deemed unnecessary for a full understanding of this invention.

It should be noted in FIGS. 1 and 3 that cylinder 18 is disposed in a vertical plane containing longitudinal axis X of the vehicle and, in particular, frame 10 thereof. Although more than one cylinder 18 may be employed, in the preferred embodiment of this invention in a single cylinder is employed to provide the desired damping of relative bouncing movements B between frame 10 and axle assembly 11. A sway bar 23, disposed transversely relative to longitudinal axis X of the vehicle in a vertical plane is pivotally interconnected between frame 10 and axle housing 13 to hold them in alignment and to prevent relative side sway between the axle housing and the frame.

Still referring to FIGS. 1 and 3, suspension system 12 further includes second suspension means 24 for solely damping relative rolling movements R between frame 10 and axle assembly 11. It should be particularly noted that suspension means 24 is disposed in a vertical plane containing axis Y and which intersects connection means 16 therewith. Thus, as shown in FIG. 1, generally vertical bouncing movements B of axle assembly 11, occurring about axis Y, will be at least substantially solely damped by cylinder 18 with little, if any, effect on suspension means 24. Thus, the suspension and damping functions of cylinder 18 and suspension means 24 are substantially isolated from each other.

Figure 4:
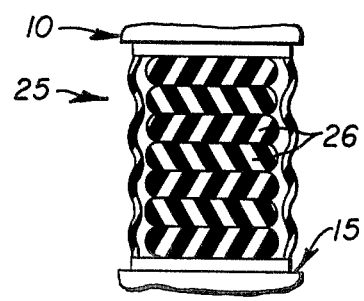
FIG. 4 is an enlarged sectional view, taken in the direction of arrows IV—IV in FIG. 1, illustrating a spring employed in the suspension system.

Suspension means 24 preferably comprises a pair of laterally spaced spring mechanisms or snubbers 25, disposed outboard of frame 10, employing dry friction to produce damping in suspension system 12 upon relative rolling movements of axle assembly 11 and frame 10. For example, referring to FIG. 4, a plurality of stacked rubber pads 26 may be suitably stacked in a conventional manner to control rolling movements R of frame 10 relative to axle assembly 11, about axis X. In addition, the pads are constructed and arranged, as shown, to further accommodate angular changes occurring between the frame and the axle assembly during relative bouncing movements B, about axis Y and responsive to the slight swaying action created by sway bar 23.

It should be particularly noted that springs 25 are not compressed vertically, i.e., will not change their lengths, during the bouncing phase of vehicle operation since they lie in the same vertical plane as connection means 16. Thus, springs 25 may exhibit the relatively "stiff" spring characteristics solely designed for damping relative rolling movements R between frame 10 and axle assembly 11. Suspension system 12 can thus be designed to be very soft in bounce, stiff in roll, and cylinder 18 thereof is adapted to occupy limited space between road wheels 14.

Industrial Applicability

Suspension system 12 finds particular application to off-highway trucks and, in particular, for suspending a rear axle assembly 11 beneath a main or truck frame 10. As discussed above, the advent of the beadless tie makes it desirable to employ wide tires having operating characteristics different than those of beaded tires in association with a vehicle suspension system which is softer in the bounce mode of operation than conventional ones.

In operation, relative bouncing movements B (FIG. 1) occurring between frame 10 and axle assembly 11, about transverse axis Y, will be solely damped by cylinder 18. During this mode of vehicle operation, springs 25 will provide little, if any, internal dampening since they are disposed in the same vertical plane as connection means 16. Otherwise stated, in a pure bounce mode of vehicle operation, rear axle assembly 11 will move up and down in FIG. 1 relative to frame 10 with single rear mounted soft cylinder 18 providing the sole support and suspension action.

Conversely, when relative rolling movements R occur between the frame and axle assembly, such movements will be solely damped by relatively stiff springs 25 in the manner descibed above. The lateral spacing of springs 25 outboard of frame 10 will provide a "wide beam effect", aiding in the stabilization of the vehicle. It should be understood, of course, that both the bounce and roll movement may occur simultaneously. As further discussed above, sway bar 23 will hold frame 10 and axle assembly 11 in alignment and will prevent side swaying of the axle assembly relative to the frame.

Other aspects, objects and advantages of this invention can be obtained from a study of the drawings, the disclosure, and the appended claims.

I claim:

1. In a vehicle disposed on a longitudinal axis (X) and having a frame (10), an axle assembly (11), connection means (16) for permitting both relative bouncing (B) and rolling (R) movements between said frame (10) and said axle assembly (11), and a suspension system (12) mounting said assembly (11) beneath said frame (10), including first suspension means (18) for damping said bouncing movement, and second suspension means (24) for damping said rolling movement (R), the improvement comprising;

said second suspension means (24) including a pair of laterally spaced springs (25) disposed in a vertical plane perpendicular to said longitudinal axis (X) and which intersects said connection means (16) and further disposed outboard of said frame (10).

2. The vehicle of claim 1 wherein another vertical plane containing said longitudinal axis (X) intersects said connection means (16) and said first suspension means (18).

3. The vehicle of claim 1 wherein said frame (10) includes a downward extension (17) and wherein said connection means (16) includes a ball and socket connection (16).

4. The vehicle of claim 1 wherein said axle assembly (11) includes an axle housing (13) and a generally T-shaped member (15) secured to said axle housing (13), said member (15) being universally connected to said frame (10) by said connection means (16) and said second suspension means (24) being mounted between said member (15) and said frame (10).

5. The vehicle of claim 1 wherein each of said springs (25) includes a plurality of stacked elastomeric pads (26).

6. The vehicle of claim 1 further including a sway bar (23) disposed in parallel relationship relative to said vertical plane and pivotally interconnected between said frame (10) and said axle assembly (11).

* * * * *